United States Patent
Endo et al.

(10) Patent No.: US 6,942,213 B2
(45) Date of Patent: Sep. 13, 2005

(54) DUPLEX SCANNING DEVICE

(75) Inventors: Katsuyuki Endo, Hatsumoto (JP); Hideki Furihata, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 180 days.

(21) Appl. No.: 10/400,106

(22) Filed: Mar. 26, 2003

(65) Prior Publication Data

US 2003/0197913 A1 Oct. 23, 2003

(30) Foreign Application Priority Data

Apr. 10, 2002 (JP) ........................................ 2002-108522

(51) Int. Cl.$^7$ ............................................. B65H 29/00
(52) U.S. Cl. ................................... 271/186; 382/318
(58) Field of Search ................................ 271/186, 286; 382/312, 315, 318

(56) References Cited

U.S. PATENT DOCUMENTS 4,734,742 A * 3/1988 Klumpp et al. ............... 355/23
5,956,152 A 9/1999 Yamada et al.

FOREIGN PATENT DOCUMENTS

| JP | 63-136762 | | 6/1988 | |
|----|-----------|---|--------|---|
| JP | 05-336305 | | 12/1993 | |
| JP | 9-307702 | | 11/1997 | |
| JP | 2000-089524 | | 3/2000 | |
| JP | 2002 - 51196 | * | 2/2002 | ............ H04N/1/04 |
| JP | 2002 - 247294 | * | 8/2002 | ............ H04N/1/04 |

* cited by examiner

*Primary Examiner*—Donald P. Walsh
*Assistant Examiner*—Kenneth W. Bower
(74) *Attorney, Agent, or Firm*—Mark P. Watson (57) ABSTRACT

A compact duplex scanner for scanning both sides of an original document scans a document smoothly without paper jams. A platen roller 8 is located opposite an image sensor 7 for scanning a paper 15 held therebetween as it is transported through a paper feed path 2b. The image sensor 7 and platen roller 8 are mounted on a rotary frame 90 designed to move circularly as a single unit around a rotary shaft positioned transversely to the paper feed path 2b. After the paper 15 is carried in a forward direction P and the front 15a of the paper 15 is scanned, the rotary frame 90 rotates 180 degrees, and the paper 15 is carried in a reverse direction to scan the back 15b.

10 Claims, 9 Drawing Sheets

DUPLEX SCANNING DEVICE

BACKGROUND OF THE INVENTION

1. Field of the Invention

The present invention relates to a scanning device used in products such as facsimile machines, scanners, and multifunction printers (MFP), and relates more particularly to a duplex scanning device for scanning both sides of an original document.

2. Description of the Related Art

Duplex scanners according to the prior art for scanning both sides of a document have either had a mechanism for reversing the original document or two sensors for scanning the opposite sides of the document.

However, the entire transportation path cannot be formed in a straight line in scanners having a reversing mechanism, and jams occur easily when transporting thin documents and thick documents. Furthermore, the curvature of the transportation path tends to cause thick originals to curl. This curl can also cause the original document to lift away from the sensor surface, and thus tends to degrade scanned image quality. Furthermore, adding the transportation path needed to reverse the original document necessarily increases the overall size of the product.

A problem with duplex scanners having two scanning sensors is that the duplication of parts results in a more complicated construction and a higher cost.

To therefore resolve these problems Japanese Patent Laid-Open Publication (kokai) H5-336305, for example, teaches a device that scans both sides of an original document using a single sensor by rotating and positioning the sensor unit containing the image sensor according to whether the front or back side of the document is being scanned.

With the prior art method described above, however, a large space is needed to rotate the image sensor and platen roller because of the large radius of rotation required by the image sensor and platen roller, and this increases the size of the product.

Furthermore, because a straight transportation path cannot be formed with the above-described prior art, paper jams occur easily during transportation, the paper lifts away from the sensor surface, and scanning quality is easily degraded.

OBJECTS OF THE INVENTION

The present invention is therefore directed to solving these problems of the prior art, and an object of this invention is to provide a small duplex scanning device capable of smoothly scanning both sides of an original document without paper jams occurring.

SUMMARY OF THE INVENTION

To achieve this object a scanning device according to the present invention for scanning both sides of a single-sheet original document has a transportation path through which the original document is transported, an image sensor for scanning an original document transported through the transportation path, a platen roller positioned opposite the image sensor for holding an original document between the image sensor and platen roller, and a rotary mechanism for circularly moving the image sensor and platen roller as a single unit around a rotary shaft positioned transverse to the transportation path.

Because the image sensor and platen roller move as a single unit circularly around an axis of rotation transverse to the transportation path, the rotating parts have a smaller radius of rotation compared with the prior art. A large space is therefore not required for the image sensor and platen roller to rotate, and the size of the device can therefore be reduced compared with the prior art.

Furthermore, because the image sensor and platen roller are rotated around a rotary shaft transverse to the paper transportation path so that their positions relative to the transportation path are reversed when scanning the front and when scanning the back of an original document, a straight transportation path can be formed. Problems such as paper jams and the original document lifting away from the sensor surface can therefore be prevented.

Further preferably, the scanning device of the present invention also has a rotary frame for supporting the image sensor and platen roller, and a stationary frame for supporting the rotary frame so the rotary frame can rotate around the rotary shaft. The rotary mechanism can thus invert the transportation path inside the rotary frame relative to the transportation path inside the stationary frame by rotating the rotary frame 180 degrees.

Yet further preferably, the scanning device also has stoppers for restricting circular movement of the rotary frame and fixing the rotary frame at a position for scanning the front of the original document or a position for scanning the back of the original document.

Yet further preferably, the scanning device also has a first gear able to rotate around the rotary shaft of the rotary frame, a second gear fixed to the rotary shaft of the platen roller, and a transfer gear for transferring power from the first gear to the second gear. When thus configured a single power source can be used to rotate the rotary frame and to rotationally drive the platen roller against the image sensor. An even simpler and smaller mechanism can therefore be achieved.

Yet further preferably in this case the scanning device also has a clutch for restricting the direction of platen roller rotation so that the platen roller rotates only in the transportation direction of the original document. In this case if power in the direction in which platen roller rotation is controlled is applied to the first gear, the platen roller is turned by the clutch and the power is used to turn the rotary frame. Because the original document is thus allowed to travel in only one direction relative to the image sensor, it is easier to manage the difference between the height of the sensor surface and the transportation path. Paper jams can therefore be easily prevented.

Yet further preferably, the scanning device also has a switching mechanism having a plurality of transfer gears. The switching mechanism changes the positions of the transfer gears to change the number of transfer gears intervening between the first gear and second gear, and thereby changes the direction of power transferred to the second gear. The direction of platen roller rotation can therefore be changed with a simple mechanism.

Yet further preferably, the scanning device also has a paper feed roller positioned near to the transportation path inside the stationary frame, and a motor for driving the paper feed roller, and the rotary mechanism is configured to operate using power from this motor.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A preferred embodiment of a scanning device according to the present invention is described below with reference to the accompanying figures.

Figure 3:
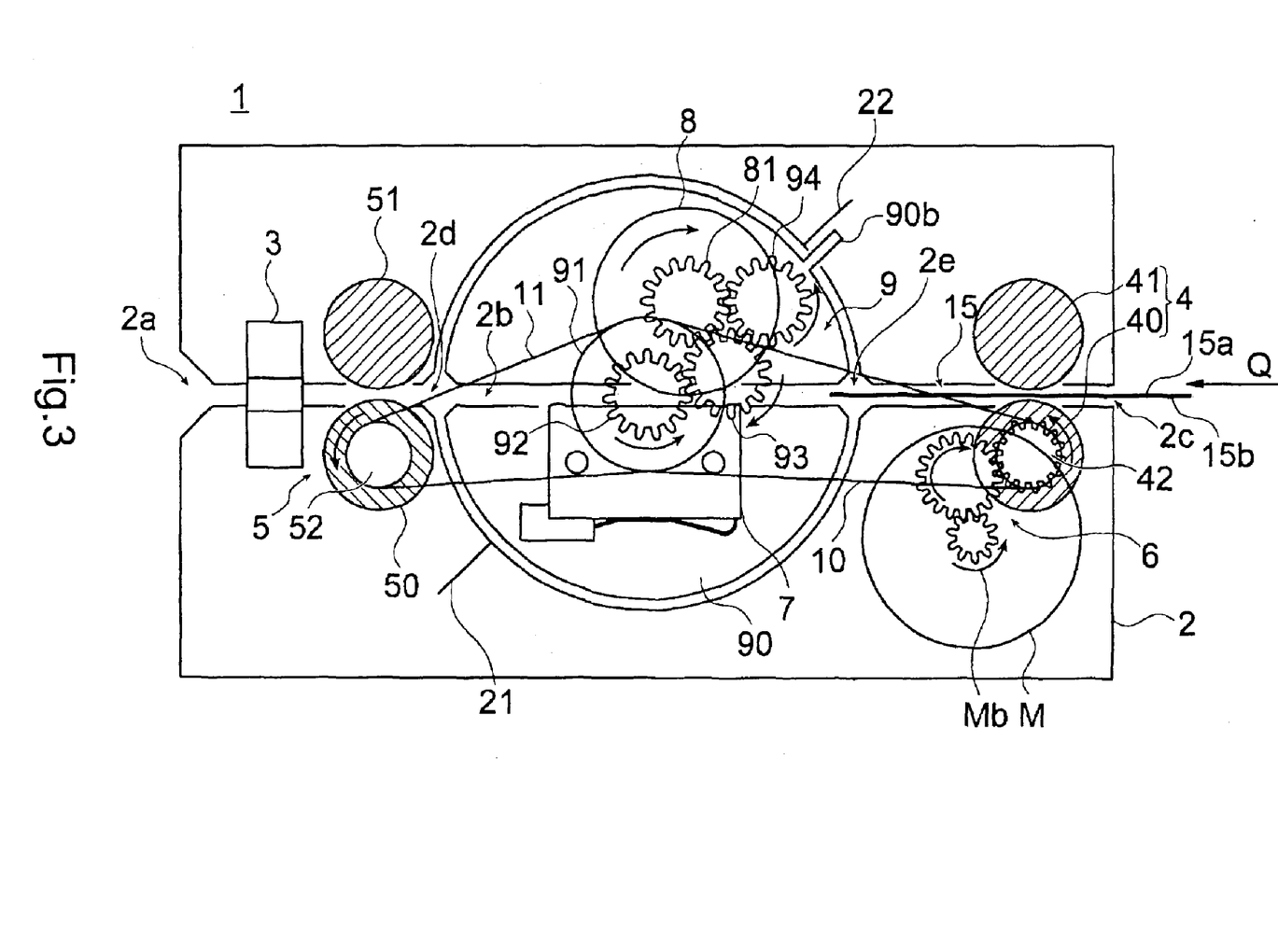
FIG. 3 is a side view of the same embodiment showing the rotary frame reversed to the position from which scanning of the back of the original document begins.
Figure 4:
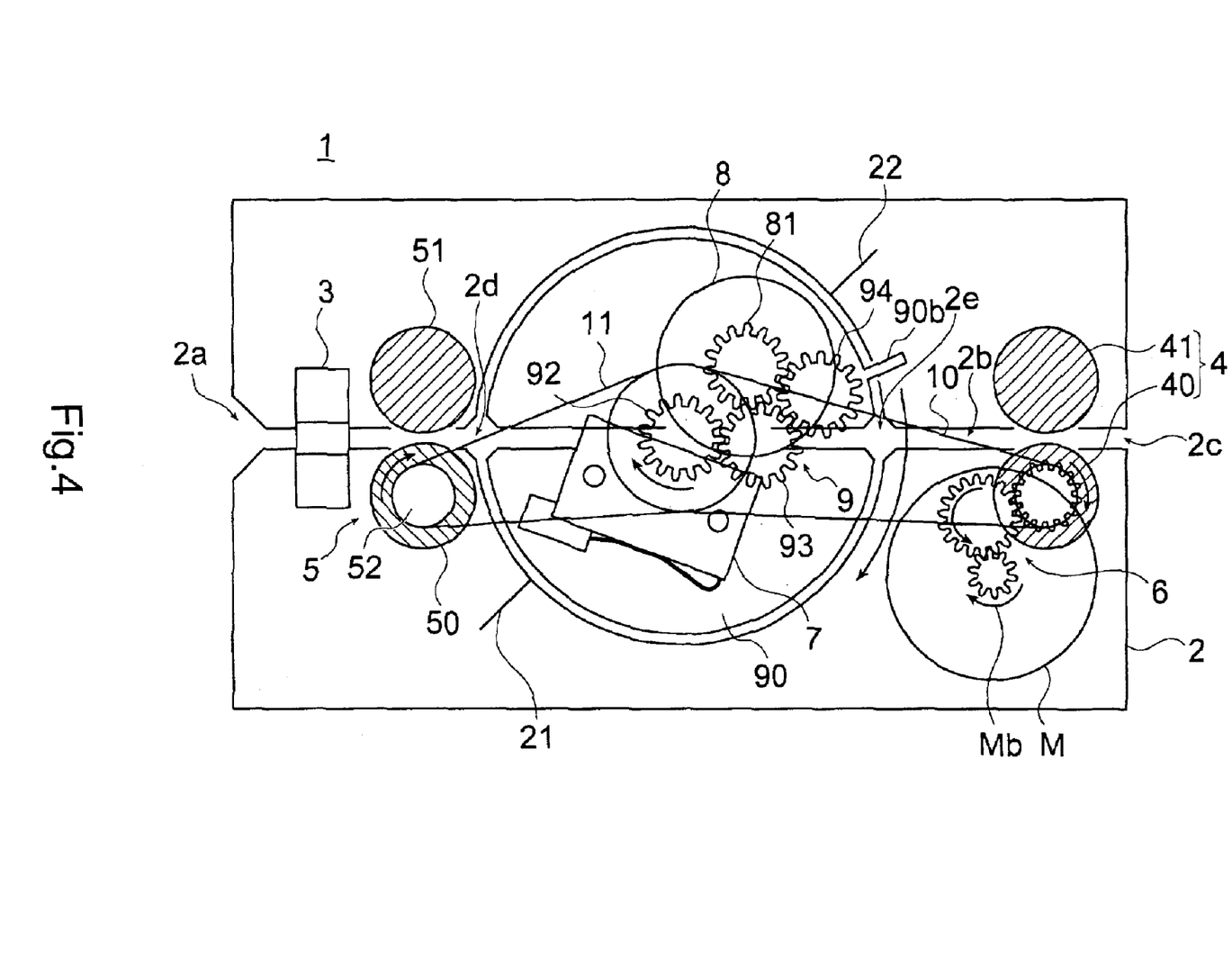
FIG. 4 is a side view of the same embodiment showing the rotary frame being turned back to the position shown in FIG. 1 after scanning of the back of the original document is completed.
Figure 5:
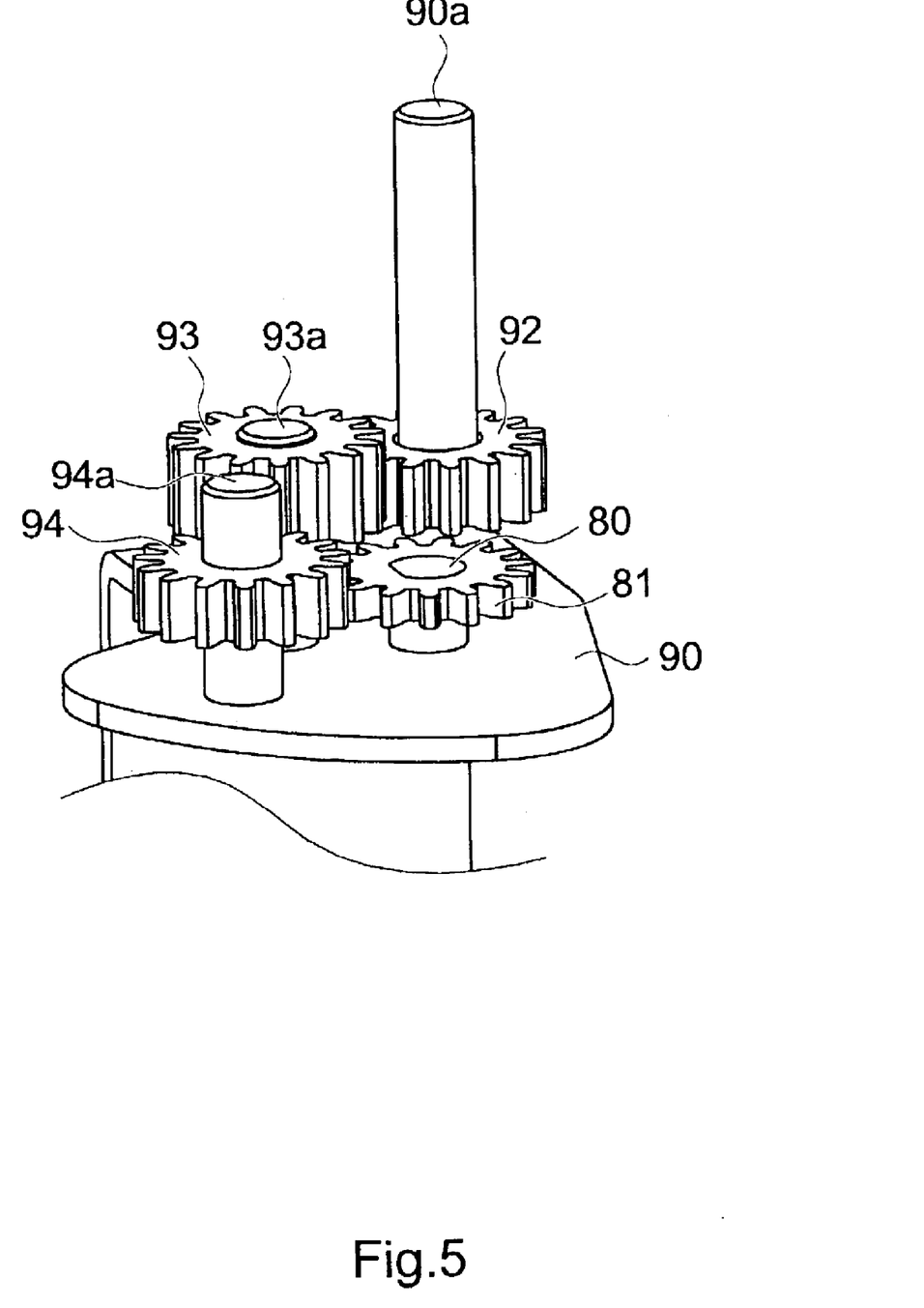
FIG. 5 and FIG. 6 are perspective views showing major components of the rotation mechanism of the same embodiment.
Figure 6:
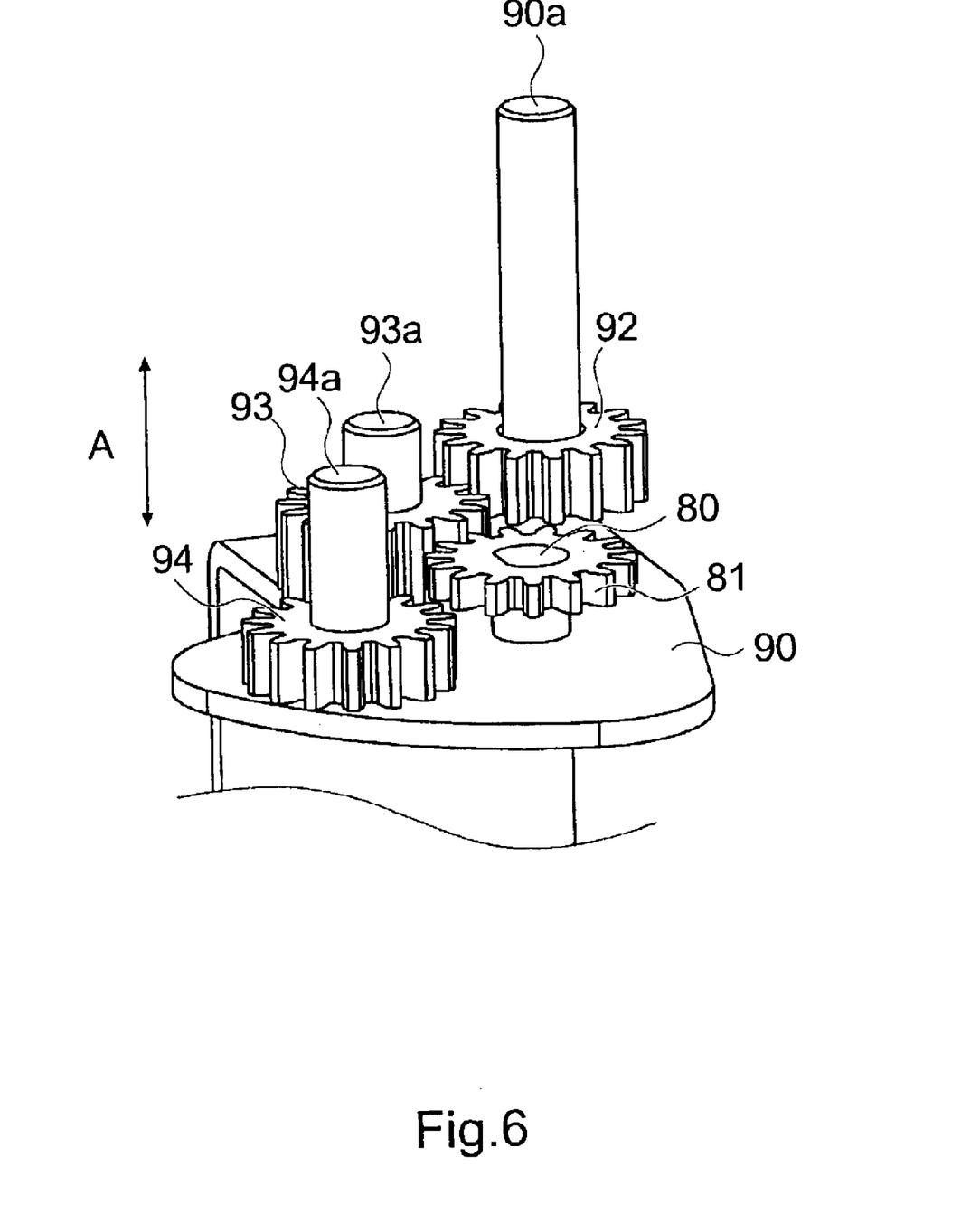
Figure 7:
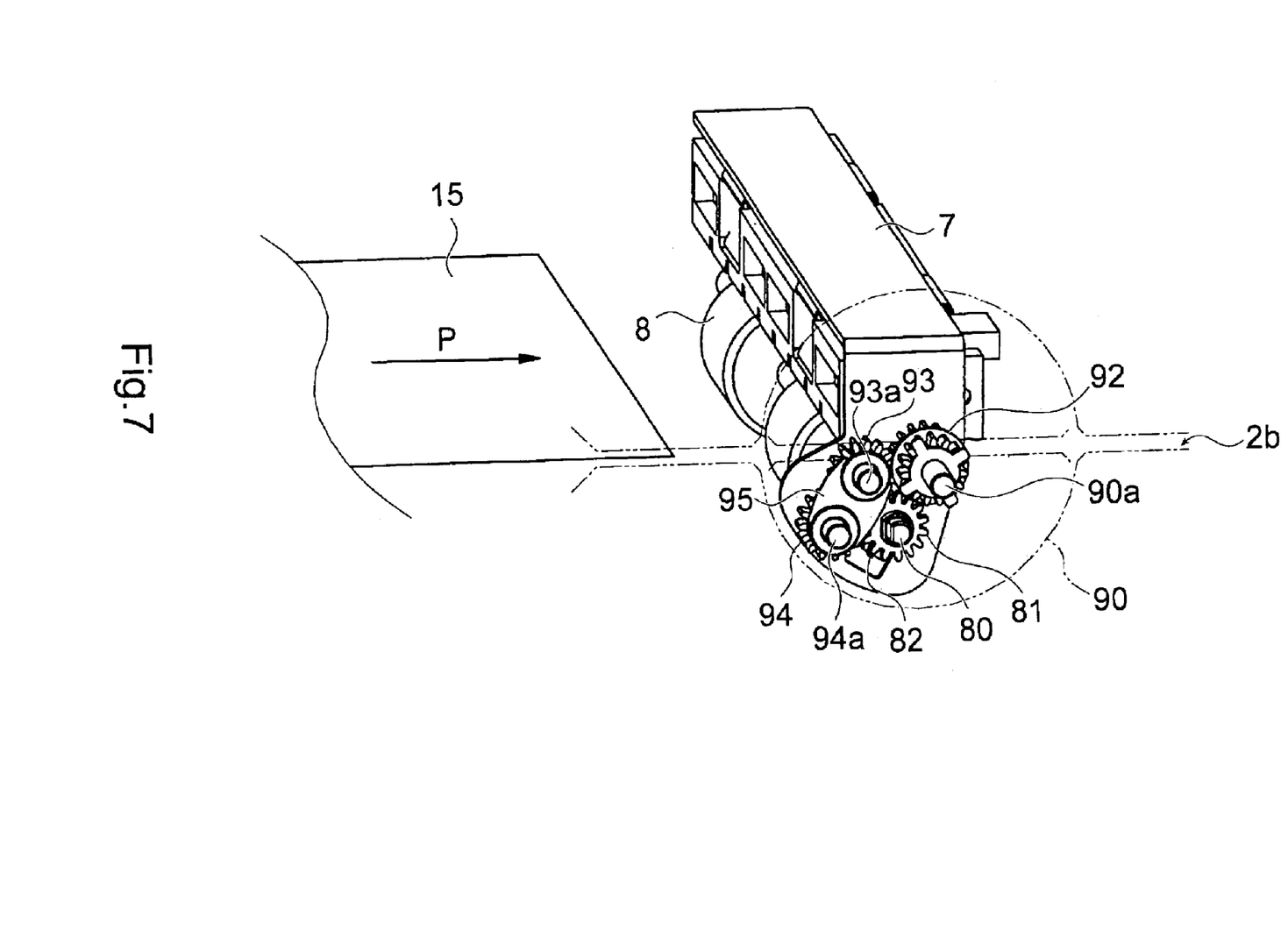
FIG. 7 and FIG. 8 are perspective views of the same embodiment showing the image sensor and platen roller part.
Figure 8:
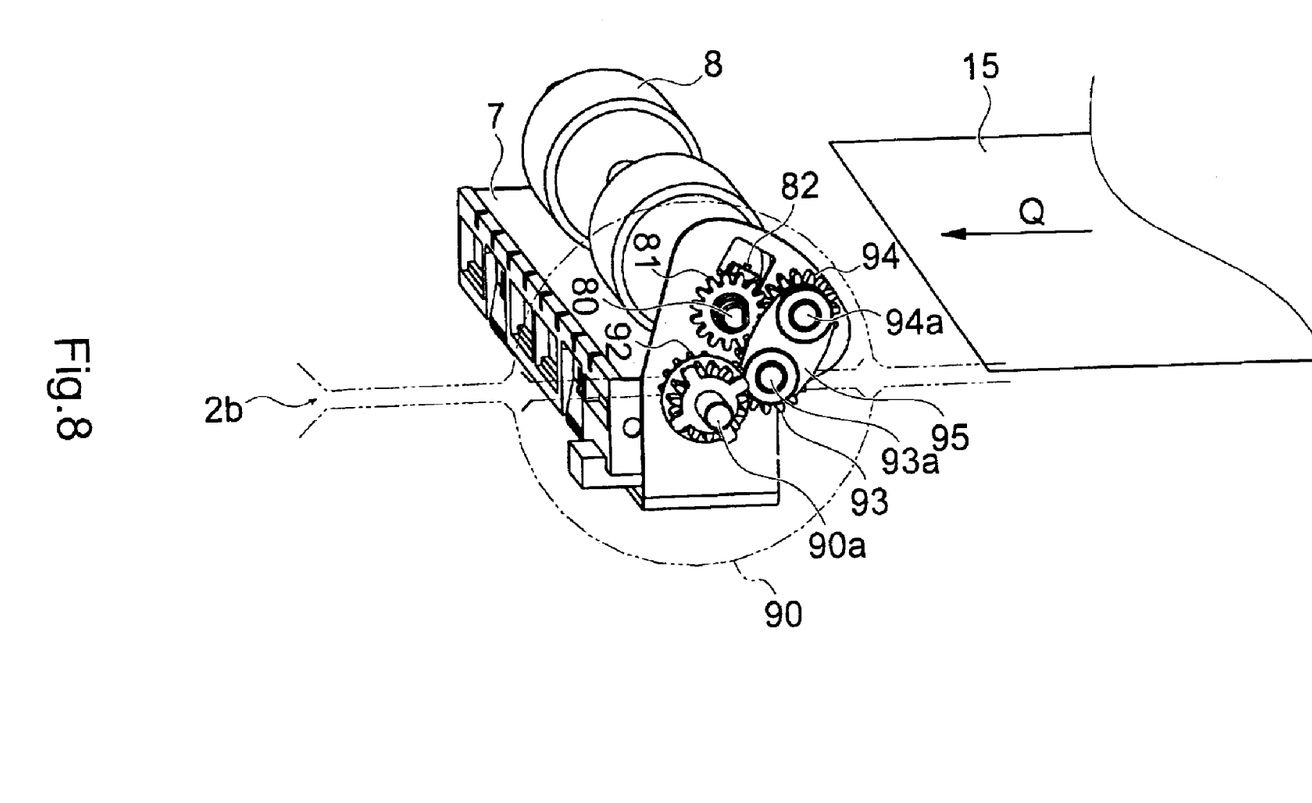

FIG. 1 to FIG. 4 illustrate the configuration and operation of a scanning device according to this preferred embodiment of the invention; FIG. 5 and FIG. 6 are perspective views showing major components of the rotation mechanism of the same embodiment; and FIG. 7 and FIG. 8 are perspective views showing the scanner part in the same embodiment.

Figure 1:
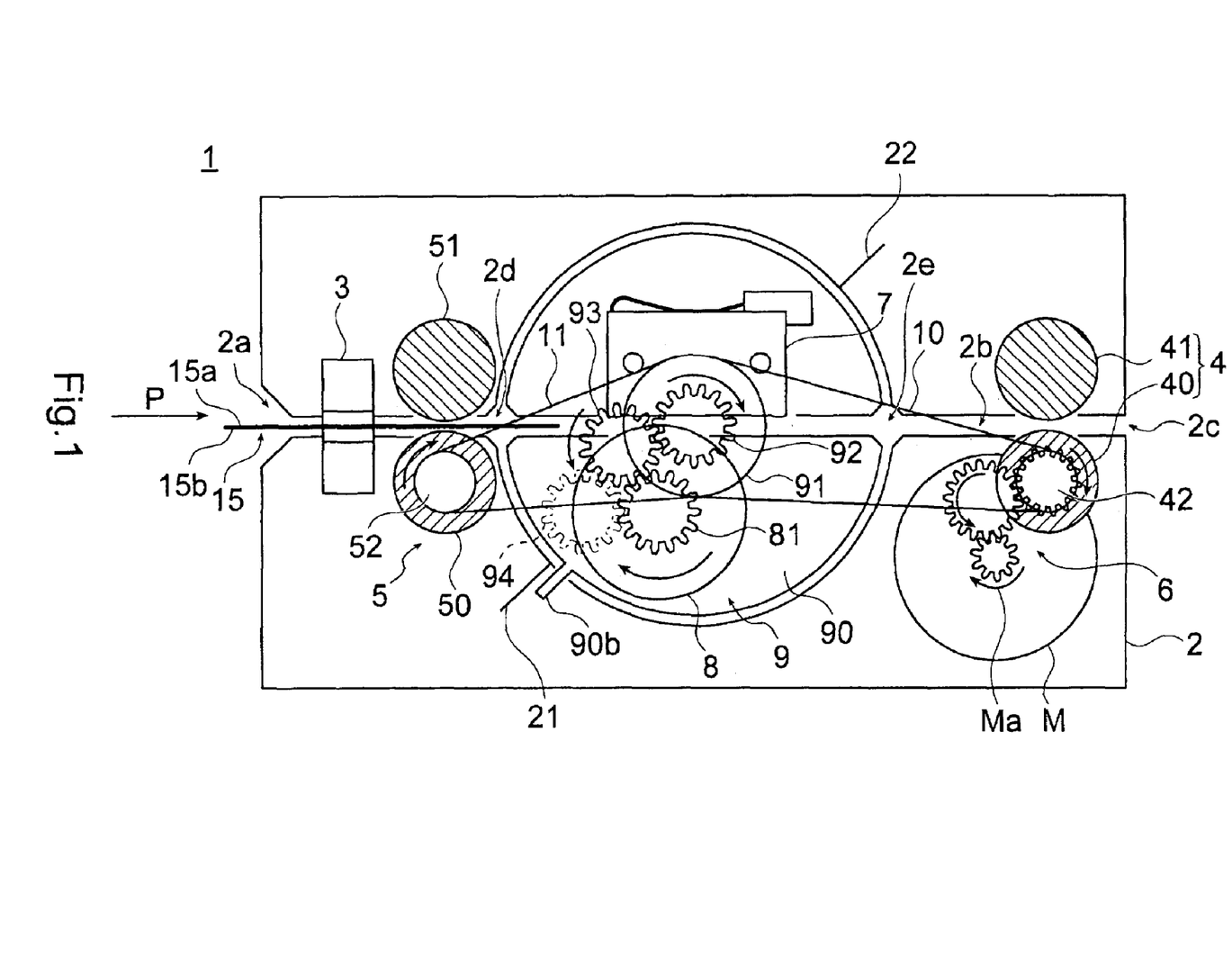
FIG. 1 is a side view of a scanning device according to a preferred embodiment of the present invention showing the position from which scanning of the front of an original document begins.

As shown in FIG. 1, a scanning device 1 according to this embodiment of the invention has a paper insertion opening 2a for receiving inserted paper (original document) 15 positioned on one end of the box-shaped housing 2 (also referred to as a stationary frame below), and a paper feed path (transportation path) 2b passing straight through the housing 2 from the paper insertion opening 2a to the paper exit 2c at the opposite end of the housing 2. This paper exit 2c enables the paper 15 to be temporarily ejected from the housing 2. A form sensor 3 is positioned near the paper insertion opening 2a for detecting the paper 15. A first feed roller pair 4 is positioned near the paper exit 2c of the housing 2.

The first feed roller pair 4 has a drive roller 40 and a driven roller 41 positioned in opposition with the paper feed path 2b therebetween. The drive roller 40 is driven by power transferred through gear train 6, which is driven by the paper feed motor M. Note that a power transfer pulley 42 further described below is fixed to the rotary shaft of the drive roller 40.

A second feed roller pair 5 is positioned near the form sensor 3 on the downstream side in the paper insertion direction. This second feed roller pair 5 has a drive roller 50 and a driven roller 51 positioned in opposition with the paper feed path 2b therebetween.

Positioned between the first feed roller pair 4 and second feed roller pair 5 are the image sensor 7 for scanning both sides of the paper 15, and platen roller 8 for pressing the paper 15 against the scanning surface of the image sensor 7. As further described below the image sensor 7 and platen roller 8 are configured as a single rotary mechanism 9.

As shown in FIG. 1 and FIG. 5 the rotary frame 90 that is part of the rotary mechanism 9 is supported freely to rotate clockwise or counterclockwise relative to the stationary frame 2 on a rotary shaft 90a positioned orthogonal to the paper feed path 2b (i.e. positioned transversely to the transportation path). As shown in these figures the paper feed path 2b also passes inside the rotary frame 90. As a result, part of the paper feed path 2b rotates around the rotary shaft 90a. The other parts (that is, both end parts) of the paper feed path 2b are positioned inside the stationary frame 2 and these end parts of the paper feed path 2b do not move. Connections 2d and 2e are positioned at the inside ends of the paper feed path 2b inside the stationary frame 2 to guide the paper 15 into and out from the rotary frame 90. The rotary shaft 90a of the rotary frame 90 is positioned at the midpoint of the line segment joining these connections 2d and 2e.

A positioning member 90b and first and second stops 21 and 22 are positioned around the periphery of the rotary frame 90. The first and second stops 21 and 22 are positioned on the stationary frame 2 side, and the positioning member 90b is able to engage the first and second stops 21 and 22. The first and second stops 21 and 22 are positioned at positions 180 degrees apart around the axis of rotation of rotary shaft 90a of the rotary frame 90.

These first and second stops 21 and 22 and positioning member 90b restrict rotation of the rotary frame 90, and thus function to stop and fix the rotary frame 90 at the position for scanning the front of the original document or the position for scanning the back of the original document. In other words, the two stops 21, 22 on the housing 2 and the positioning member 90b of the rotary frame 90 enable the rotary frame 90 to be switched between a front scanning position (shown in FIG. 1) and a back scanning position (shown in FIG. 3).

A pulley 91 is mounted to the rotary shaft 90a of the rotary frame 90. A drive belt 10 winds around the pulley 42 on the rotary shaft of the drive roller 40 in the first feed roller pair 4 and the pulley 91 on the rotary shaft 90a of the rotary frame 90 (open belt drive). As a result, power from the paper feed motor M is transferred in the same direction to the pulley 91 at a specific speed reduction ratio via the pulley 42 and drive belt 10.

Another drive belt 11 is likewise mounted on the pulley 91 on the rotary shaft 90a of rotary frame 90 and also on the pulley 52 fixed to the drive roller 50 of the second feed roller pair 5 (open belt drive). As a result, power from the pulley 91 is transferred through drive belt 11 and pulley 52 in the same direction at a specific speed reduction ratio to the drive roller 50 of the second feed roller pair 5.

The image sensor 7 is, for example, a contact image sensor (CIS) mounted on the rotary frame 90 so that it is near one side of the paper feed path 2b and extends widthwise to the paper feed path 2b with a size substantially equal to the width of the paper 15.

The platen roller 8 is mounted on the rotary frame 90 so that it is positioned opposite the image sensor 7 with the paper feed path 2b positioned therebetween. The platen roller 8 is configured so that it rotates in one direction only (clockwise in this embodiment of the invention) around a rotary shaft 80 that is parallel to the rotary shaft 90a of the rotary frame 90 using a clutch spring 82 (best seen in FIG. 7, described hereinafter), for example.

As shown in FIG. 5 and FIG. 6 a main gear (first gear) 92 able to rotate synchronously with the pulley 91 is mounted on the rotary shaft 90a of rotary frame 90. Paper feed gear (second gear) 81 is mounted on the rotary shaft 80 of the platen roller 8. It should be noted that the paper feed gear 81 is fixed to the rotary shaft 80, but the other gears 92, 93, and 94 shown in FIG. 5 and FIG. 6 can rotate freely on shafts 90a, 93a, and 94a, respectively.

A first transfer gear 93 meshing with main gear 92 and circularly movable around rotary shaft 93a parallel to the rotary shaft 90a is also positioned in the rotary frame 90. A second transfer gear 94 meshing with the first transfer gear 93 and circularly movable around rotary shaft 94a parallel to rotary shaft 90a is also positioned in the rotary frame 90. The first transfer gear 93 is supported slidably in the axial direction (arrow A) on rotary shaft 93a, and the second transfer gear 94 is likewise supported slidably in the axial direction (arrow A) on rotary shaft 94a.

As shown in FIG. 7 and FIG. 8, first and second transfer gears 93, 94 are mounted positioned between two plate members of switching lever 95. The switching lever 95 is driven by a solenoid or other actuator not shown in the figures. The switching lever 95 thus holds the first and second transfer gears 93, 94 engaged with each other while enabling the first and second transfer gears 93, 94 to travel in the axial direction on their respective shafts.

When the switching lever 95 is pulled out to the position shown in FIG. 5, the two transfer gears 93, 94 mesh between the main gear 92 and paper feed gear 81. When the transfer gears 93, 94 are pushed in to the position shown in FIG. 6, second transfer gear 94 disengages from between main gear 92 and paper feed gear 81, leaving only the first transfer gear 93 meshed with main gear 92 and paper feed gear 81.

Figure 9:
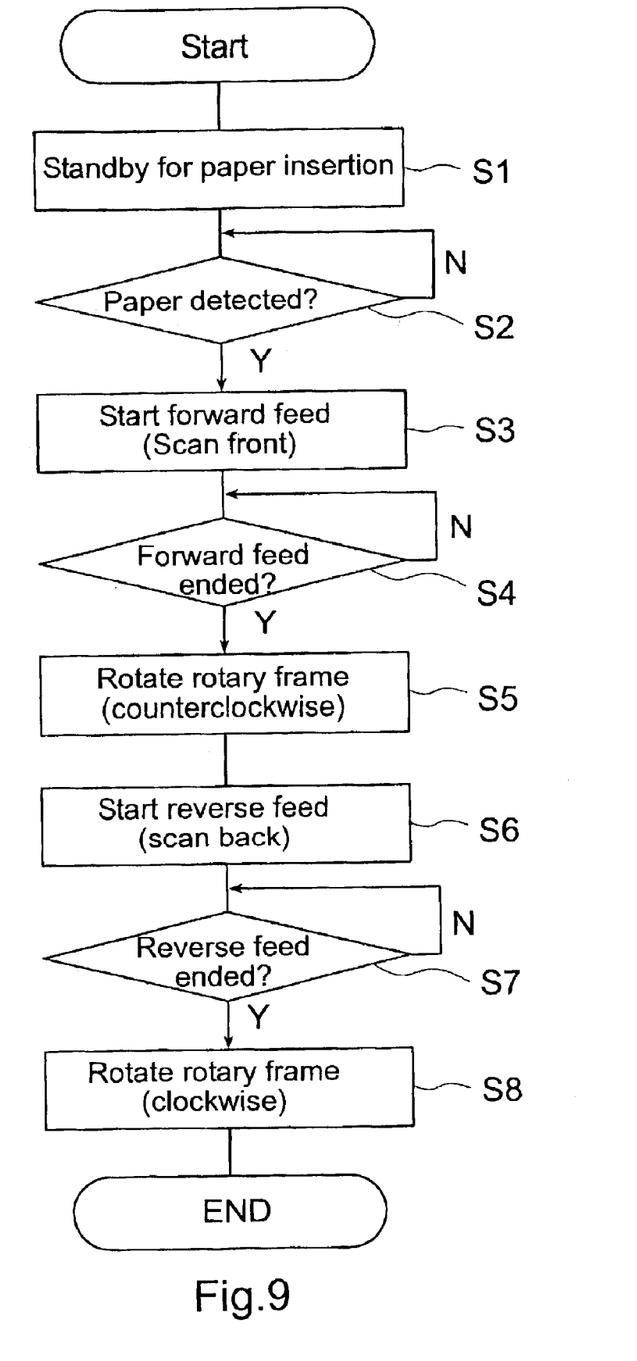
FIG. 9 is a flow chart illustrating the operation of the present invention.

FIG. 9 is a flow chart describing operation of the present embodiment. In the starting position, before scanning both sides of the paper 15, the switching lever 95 is positioned so that the first transfer gear 93 meshes with the paper feed gear 81 as shown in FIG. 6. This is the standby position.

When paper 15 is then inserted into the scanning device 1 in this standby position (step S1) and is detected by the form sensor 3 (step S2, Yes), the paper feed motor M turns in forward direction Ma (FIG. 1) and scanning the front 15a of the paper 15 begins (step S3). The first feed roller pair 4 thus turns in the forward direction, power is transferred from pulley 42, drive belt 10, pulley 91, and drive belt 11 to pulley 52, and the second feed roller pair 5 thus also turns in the forward direction. The paper 15 is thus carried in forward direction P.

Power from pulley 91 on rotary shaft 90a of rotary frame 90 is transferred through power transfer (main) gear 92, power transfer (first transfer) gear 93, and paper feed gear 81, that is, an odd number of gears, to the platen roller 8. The platen roller 8 thus turns clockwise and advances the paper 15 in the forward direction P.

After scanning the front 15a of paper 15 ends, that is, after paper feed in the forward direction ends (step S4, Yes), the paper feed motor M turns in the reverse direction Mb (FIG. 3). Because the first feed roller pair 4 thus turns in the reverse direction, the paper 15 is transported in the reverse direction Q. In addition, power from the first feed roller pair 4 is transferred through drive belt 10, pulley 91, and drive belt 11 to pulley 52, and second feed roller pair 5 therefore also turns in reverse.

Figure 2:
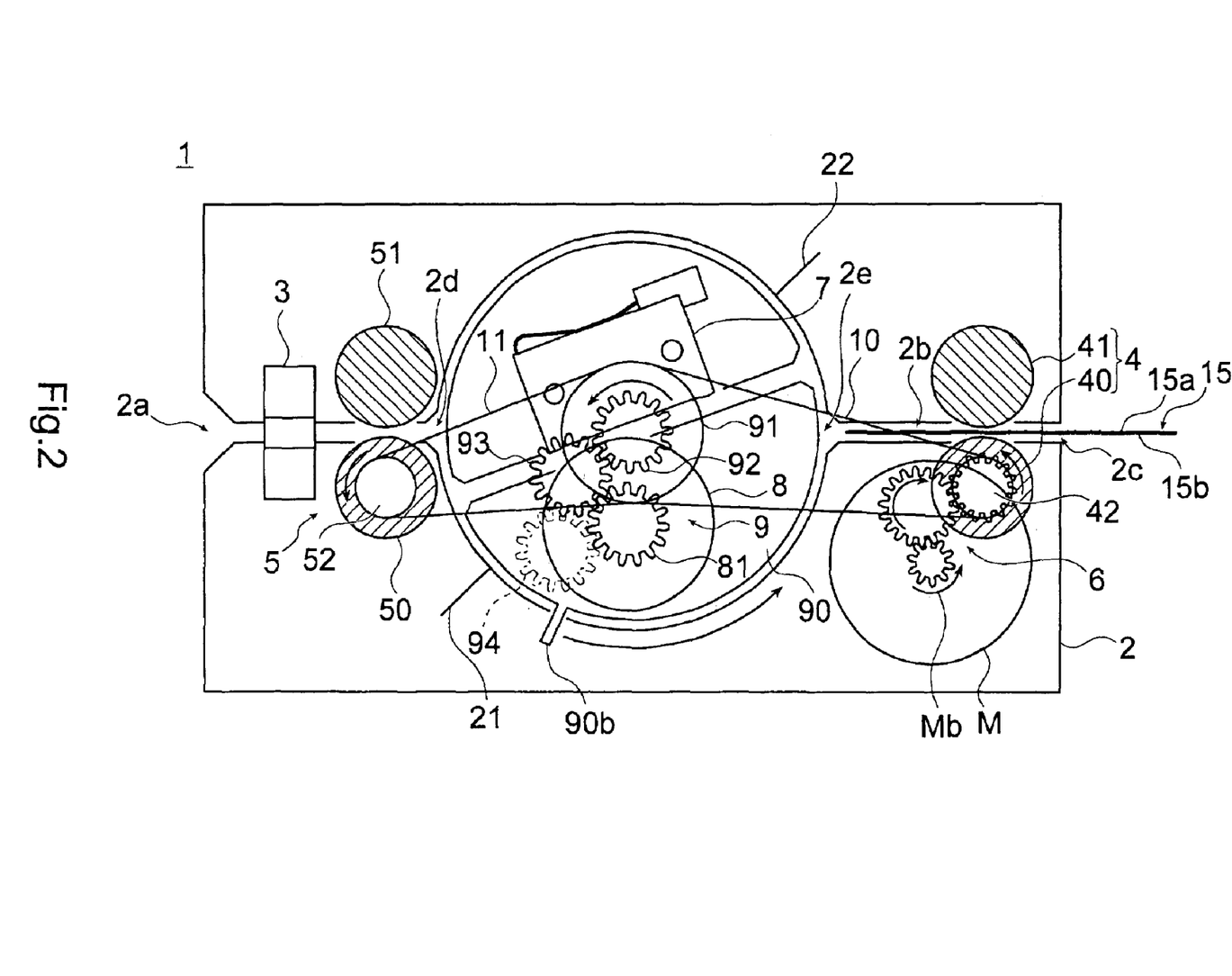
FIG. 2 is a side view of the same embodiment showing the rotary frame being turned in order to scan the back of an original document.

Power from pulley 91 on rotary shaft 90a of rotary frame 90 is likewise transferred through main gear 92, first transfer gear 93, and paper feed gear 81 to the platen roller 8. However, because the clutch spring 82 allows the platen roller 8 to turn only clockwise and the platen roller 8 is therefore restricted from turning in the reverse direction, the rotary frame 90 itself rotates counterclockwise as shown in FIG. 2 (step S5).

When the positioning member 90b then contacts the second stop 22 and the rotary frame 90 is set to the back scanning position shown in FIG. 3, an actuator (not shown in the figure) is driven to switch the switching lever 95 so that the second transfer gear 94 meshes with paper feed gear 81 as shown in FIG. 5.

When the paper feed motor M thereafter turns in reverse direction Mb, power from the pulley 91 on rotary shaft 90a of rotary frame 90 is transferred to the rotary shaft 80 through main gear 92, power transfer (first transfer) gear 93, second transfer gear 94, and paper feed gear 81, that is, an even number of gears. By thus transferring drive power through an even number of gears, the platen roller 8 turns clockwise and the paper 15 is transported in reverse direction Q. Scanning the back 15b of the paper 15 then starts while the paper 15 is carried in the reverse direction Q (step S6).

After the form sensor 3 then detects that the paper 15 was ejected (step S7, Yes), the paper feed motor M is driven in the forward direction Ma. Both the first feed roller pair 4 and second feed roller pair 5 turn in the forward direction at this time but because the paper 15 has already been ejected nothing is transported through the paper path. In addition, power from the pulley 91 on rotary shaft 90a of the rotary frame 90 is transferred through main gear 92, first transfer gear 93, and paper feed gear 81 to the platen roller 8. However, because the clutch spring 82 only allows the platen roller 8 to turn clockwise and thus restricts the direction of rotation, the rotary frame 90 itself turns clockwise as shown in FIG. 4 (step S8).

The positioning member 90b then contacts the first stop 21 on the housing 2 and the paper feed motor M stops with the rotary frame 90 positioned at the front scanning position shown in FIG. 1. An actuator (not shown in the figure) is then driven to return the switching lever 95 to the position at which the first transfer gear 93 meshes with the paper feed gear 81 as shown in FIG. 5, thereby restoring the form insertion standby position (step S1).

Because the image sensor 7 and platen roller 8 in this embodiment of the present invention move as a single unit circularly around a rotary shaft 90a traversing the paper feed path 2b, the rotating parts have a smaller radius of rotation compared with the prior art. A large space is therefore not required for the image sensor 7 and platen roller 8 to rotate, and the size of the device can therefore be reduced compared with the prior art.

Furthermore, because the image sensor 7 and platen roller 8 are rotated around a rotary shaft 90a traversing the paper transportation path so that their positions relative to the transportation path are reversed when scanning the front and when scanning the back of an original document, the paper feed path 2b of the paper 15 can be formed in a straight line. Problems such as paper jams and the original document lifting away from the sensor surface can therefore be prevented.

Furthermore, because the main gear 92, first and second transfer gears 93, 94, and roller drive gear 81 are positioned in the rotary frame 90, which holds the image sensor 7 and platen roller 8 and can rotate around the rotary shaft 90a, a single power source can rotate the rotary frame 90 as well as drive the platen roller 8 relative to the image sensor 7. The present invention therefore simplifies the construction and further decreases the size of the device.

Even more particularly, the number of drive sources can be reduced because the rotary mechanism 9 is designed to operate using the paper feed motor M that drives the feed rollers 4 and 5 that transport the paper 15.

Yet further, because a clutch restricting the direction of platen roller 8 rotation is positioned in this embodiment so that the platen roller 8 turns only in the direction advancing the paper 15, the paper 15 can be advanced by rotation of the platen roller 8 in the forward direction while the image sensor 7 and platen roller 8 can be rotated to different operating positions by rotation in the opposite direction. A duplex scanner with a simple mechanical design providing reliable document transportation can therefore be provided. Furthermore, because the original document is transported in one direction relative to the image sensor, managing differences in the elevation of the scanner surface and transportation path is easier and paper jams can therefore be reliably prevented.

Yet further, by providing a switching lever 95 for moving the transfer gears 93, 94 to change the direction of the power applied to the paper feed gear 81 by changing how the first transfer gear 93 and second transfer gear 94 mesh with the main gear 92 and paper feed gear 81, the direction of platen roller 8 rotation can be changed with a simple mechanism.

It will be obvious to one with ordinary skill in the related art that the present invention shall not be limited to the embodiment described above and can be varied in many ways without departing from the scope of the accompanying claims. For example, two transfer gears 93, 94 are used in the above embodiment to change the direction of power transferred to the paper feed gear 81. The invention shall not be so limited, however, as a combination of three or more gears could be used.

Furthermore, the rotary mechanism 9 is operated using power from the paper feed motor M for transporting the paper 15 in the above embodiment, but power from a motor other than the paper feed motor M could be used to operate the rotary mechanism 9. A configuration such as described above, however, will be simpler.

Furthermore, the rotary mechanism of the present invention could be built using a power transfer mechanism other than gears. The power transfer mechanism could, for example, use pulleys and belts.

Yet further, the present invention could be applied to scanning devices using various types of sensors, including CCD, other than a contact image sensor.

Because the image sensor and platen roller are configured in the present invention so as to move as a single unit circularly around a rotary shaft traversing the transportation path, the radius of rotation for the rotary parts is smaller than in the prior art. As a result, a large space is not needed to rotate the image sensor and platen roller, and the scanning device can be made smaller.

Furthermore, because the image sensor and platen roller are rotated around a rotary shaft traversing the paper transportation path so that their positions relative to the transportation path are reversed when scanning the front and when scanning the back of an original document, the transportation path of the original document can be formed in a straight line. Problems such as paper jams and the original document lifting away from the sensor surface can therefore be prevented.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A scanning device for scanning both sides of a single-sheet original document, comprising:
    a transportation path through which the original document is transported;
    an image sensor that scans the original document transported through the transportation path;
    a platen roller positioned opposite the image sensor that holds the original document against the image sensor;
    a rotary mechanism that circularly moves the image sensor and platen roller as a single unit around a rotary shaft positioned transversely to the transportation path; and
    a motor that
        turns in one direction to drive the platen roller in a first direction and feed the original document through the transportation path in a forward direction, and
        turns in another direction to drive the rotary mechanism to move the image sensor and platen to a rotated position and thereafter drive the platen roller in the first direction and feed the original document through the transportation path in a reverse direction.

2. A scanning device as described in claim 1, further comprising:
    a rotary frame that supports the image sensor and platen roller; and
    a stationary frame that supports the rotary frame such that the rotary frame can rotate around the rotary shaft; and
    wherein the rotary mechanism reverses the transportation path inside the rotary frame relative to the transportation path inside the stationary frame by rotating the rotary frame.

3. A scanning device as described in claim 2, further comprising stoppers for restricting circular movement of the rotary frame and fixing the rotary frame at a position for scanning the front of the original document and a position for scanning the back of the original document.

4. A scanning device as described in claim 2, further comprising:
    a first gear that rotates around the rotary shaft of the rotary frame;
    a second gear fixed to a rotary shaft of the platen roller; and
    a transfer gear for transferring power from the first gear to the second gear.

5. A scanning device as described in claim 4, further comprising a clutch for restricting the direction of platen roller rotation so that the platen roller rotates only in the transportation direction of the original document.

6. A scanning device as described in claim 4, further comprising a switching mechanism having a plurality of transfer gears for changing the direction of power transferred to the second gear by changing the number of transfer gears intervening between the first gear and second gear by changing the transfer gear positions.

7. A scanning device as described in claim 2, further comprising a paper feed roller positioned next to the transportation path inside the stationary frame; and
    the motor drives the paper feed roller; and
    a power transfer mechanism that operates the rotary mechanism using power from the motor.

8. A scanning device for scanning both sides of a single-sheet original document, comprising:
    a transportation path through which the original document is transported;

an image sensor that scans the original document transported through the transportation path;

a platen roller positioned opposite the image sensor that holds the original document against the image sensor;

a rotary mechanism that circularly moves the image sensor and platen roller as a single unit around a rotary shaft positioned transversely to the transportation path;

a rotary frame that supports the image sensor and platen roller; and a stationary frame that supports the rotary frame such that the rotary frame can rotate around the rotary shaft;

wherein the rotary mechanism reverses the transportation path inside the rotary frame relative to the transportation path inside the stationary frame by rotating the rotary frame; and stoppers for restricting circular movement of the rotary frame and fixing the rotary frame at a position for scanning the front of the original document and a position for scanning the back of the original document.

9. A scanning device for scanning both sides of a single-sheet original document, comprising:

a transportation path through which the original document is transported;

an image sensor that scans the original document transported through the transportation path;

a platen roller positioned opposite the image sensor that holds the original document against the image sensor;

a rotary mechanism that circularly moves the image sensor and platen roller as a single unit around a rotary shaft positioned transversely to the transportation path;

a rotary frame that supports the image sensor and platen roller; and a stationary frame that supports the rotary frame such that the rotary frame can rotate around the rotary shaft;

wherein the rotary mechanism reverses the transportation path inside the rotary frame relative to the transportation path inside the stationary frame by rotating the rotary frame;

a first gear that rotates around the rotary shaft of the rotary frame;

a second gear fixed to a rotary shaft of the platen roller; and a transfer gear for transferring power from the first gear to the second gear.

10. A scanning device for scanning both sides of a single-sheet original document, comprising:

a transportation path through which the original document is transported;

an image sensor that scans the original document transported through the transportation path;

a platen roller positioned opposite the image sensor that holds the original document against the image sensor;

a rotary mechanism that circularly moves the image sensor and platen roller as a single unit around a rotary shaft positioned transversely to the transportation path;

a rotary frame that supports the image sensor and platen roller; and a stationary frame that supports the rotary frame such that the rotary frame can rotate around the rotary shaft;

wherein the rotary mechanism reverses the transportation path inside the rotary frame relative to the transportation path inside the stationary frame by rotating the rotary frame;

a paper feed roller positioned next to the transportation path inside the stationary frame;

a motor for driving the paper feed roller; and a power transfer mechanism that operates the rotary mechanism using power from the motor.

* * * * *